United States Patent
Wette

(10) Patent No.: US 11,574,537 B2
(45) Date of Patent: Feb. 7, 2023

(54) ASCERTAINING A NUMBER OF TRAFFIC LANES AND LANE MARKINGS ON ROAD SEGMENTS

(71) Applicant: Robert Bosch GmbH, Stuttgart (DE)

(72) Inventor: Philip Wette, Bueckeburg (DE)

(73) Assignee: Robert Bosch GmbH, Stuttgart (DE)

( * ) Notice: Subject to any disclaimer, the term of this patent is extended or adjusted under 35 U.S.C. 154(b) by 514 days.

(21) Appl. No.: 16/654,711

(22) Filed: Oct. 16, 2019

(65) Prior Publication Data
US 2020/0126405 A1  Apr. 23, 2020

(30) Foreign Application Priority Data

Oct. 22, 2018 (DE) .......................... 102018218043.1

(51) Int. Cl.
| | |
|---|---|
| G08G 1/01 | (2006.01) |
| B60W 30/12 | (2020.01) |
| G08G 1/056 | (2006.01) |
| G06V 20/59 | (2022.01) |
| G06V 20/56 | (2022.01) |
| G06V 40/10 | (2022.01) |

(52) U.S. Cl.
CPC ........... *G08G 1/0112* (2013.01); *B60W 30/12* (2013.01); *G06V 20/588* (2022.01); *G06V 20/59* (2022.01); *G06V 40/103* (2022.01); *G08G 1/0133* (2013.01); *G08G 1/0141* (2013.01); *G08G 1/056* (2013.01); *B60W 2556/50* (2020.02)

(58) Field of Classification Search
CPC .................................................. G06V 20/588
See application file for complete search history.

(56) References Cited

U.S. PATENT DOCUMENTS

| | | | |
|---|---|---|---|
| 2017/0016740 A1 | 1/2017 | Cui et al. | |
| 2018/0024562 A1* | 1/2018 | Bellaiche | G06T 7/73 701/26 |
| 2018/0025234 A1* | 1/2018 | Myers | G06V 10/82 348/148 |
| 2019/0095722 A1* | 3/2019 | Kang | G08G 1/167 |

FOREIGN PATENT DOCUMENTS

| | | |
|---|---|---|
| CN | 108335484 A | 7/2018 |
| CN | 108387239 A | 8/2018 |
| DE | 102017005020 A1 | 12/2017 |
| DE | 102017116212 A1 | 3/2018 |
| DE | 102017116213 A1 | 3/2018 |
| EP | 3534114 A1 | 9/2019 |
| JP | 2005345201 A | 12/2005 |
| JP | 2017144769 A | 8/2017 |
| WO | 2018024370 A1 | 2/2018 |

* cited by examiner

*Primary Examiner* — Jeff A Burke
*Assistant Examiner* — Christopher A Buksa
(74) *Attorney, Agent, or Firm* — Norton Rose Fulbright US LLP; Gerard Messina

(57) ABSTRACT

A method is described for creating observation data, in particular by at least one vehicle, traveled road segments being ascertained by the vehicle, lanes of the road segments traveled by the vehicle being ascertained by the vehicle, and the ascertained road segments together with the ascertained traveled lanes being transmitted as observation data from the vehicle to an external server unit. A method for ascertaining a number of traffic lanes, to a system, to an external server unit, and to a control unit are also described.

8 Claims, 4 Drawing Sheets

ASCERTAINING A NUMBER OF TRAFFIC LANES AND LANE MARKINGS ON ROAD SEGMENTS

CROSS REFERENCE

The present application claims the benefit under 35 U.S.C. § 119 of German Patent Application No. DE 102018218043.1 filed on Oct. 22, 2018, which is expressly incorporated herein by reference in its entirety.

FIELD

The present invention relates to a method for creating observation data, to a method for ascertaining a number of traffic lanes, to a system for collecting data regarding roads, to an external server unit, and to a control unit.

BACKGROUND INFORMATION

Driver assistance systems which assist a driver with lane-keeping are conventional. The traffic lane presently traveled by the vehicle is identified by the system in the process by a host lane localization, and the driver is warned, for example, against an inadvertent departure from the traffic lane.

Moreover, conventional methods ascertain all lanes of a roadway based on geometric properties by the interpretation of sensor data. Such methods evaluate entire surroundings of a vehicle and require complex analysis algorithms for this purpose. Relatively high data volumes arise for the analysis of the entire surroundings. Moreover, highly precise and complex localization mechanisms are required for such methods.

The conventional methods for generating lane-accurate road maps are associated with high manual complexity. In addition, the conventional vehicles use special, usually cost-intensive hardware for recording surroundings.

SUMMARY

An object of the present invention is to provide a method and a system which are able to establish a number of traffic lanes of a road segment with preferably little complexity.

This object may be achieved with the aid of example embodiments of the present invention described herein. Advantageous embodiments of the present invention are described herein.

According to one aspect of the present invention, a method for creating observation data, in particular by at least one vehicle, is provided. Traveled road segments are ascertained by the vehicle, and lanes of the road segments traveled by the vehicle are ascertained by the vehicle. The ascertained road segments are transmitted together with the ascertained traveled lanes as observation data from the vehicle to an external server unit.

According to a further aspect of the present invention, a method for ascertaining a number of traffic lanes with the aid of observations by at least one vehicle is provided. Road segments ascertained by the vehicle are received together with ascertained traveled lanes as observation data by an external server unit. Based on the transmitted observation data, a number of traveled lanes of at least one road segment is established by the external server unit and assigned as information to a digital map.

According to a further aspect of the present invention, a system for collecting data regarding roads is provided. The system includes at least one external server unit and at least two vehicles, the vehicles including a control unit. The control unit is connectable to at least one sensor for carrying out a host lane localization, and to a communication unit for transmitting pieces of information to the external server unit. The system is preferably configured to carry out the methods according to the present invention.

According to one further aspect of the present invention, an external server unit for receiving and evaluating observation data is provided, the external server unit being configured to carry out the method for ascertaining a number of traffic lanes with the aid of observations by at least one vehicle.

According to one further aspect of the present invention, a control unit, in particular for a vehicle, is provided. The control unit is connectable to at least one sensor for carrying out a host lane localization and to at least one communication unit. The control unit is configured to carry out a method for creating observation data.

As a result of the method for creating observation data, for ascertaining a number of traffic lanes with the aid of observations by at least one vehicle and by the system, observations by vehicles may be used with minimal technical complexity to update or create digital road maps. Based on a plurality of observations, it is possible, in particular, to establish the number of lanes of roadways and to store it in a digital road map. For this purpose, it is checked by each vehicle on which traffic lane, among possible traffic lanes, it is situated on a road segment. The roads of a digital map may be divided by even or odd segments, pieces of information being assigned to each road segment. For example, one road segment may have a defined length or be delimited by distinctive points, such as intersections or signs. With an increasing number of vehicles, statistically all possible roadways are also traveled, and thus detected, by the vehicles. Based on the identification of the corresponding lane by the vehicles and the transmission of this information to the external server unit, all traveled roadways of road segments may be detected in the server unit. These observations of the vehicles may be transmitted to the server unit in the form of sensor data or in the form of data packets. Preferably, the vehicles may utilize a wireless communication link, such as WLAN, GSM, UMTS, LTE and the like, for this purpose.

The example methods may be designed to be fully automatic and thus allow a lane-accurate digital road map to be updated or created from a great number of observations carried out by a vehicle fleet. In particular, an automatic generation of attributes for digital road maps from a series of observations of a fleet of vehicles may be implemented. The attributes may, for example, be the number of lanes of a road segment and the kind of lane markings which separate the respective lanes from one another on this road segment.

The observations of the vehicle fleet may, for example, include a sequence of the traveled road segments and the used lanes along the road segments. These observations may be carried out by any vehicle which is able to locate its accurate lane on a road map and, for example, includes a camera.

As a result of the statistical evaluation of the observation data transmitted to the server unit, the method is designed to be tolerant with respect to observations of individual vehicles which are subject to errors.

According to one exemplary embodiment, the respective traffic lane traveled along a road segment is ascertained by a host lane estimation of the at least two vehicles, the host lane estimation being carried out by at least two vehicles with the aid of camera-based systems. The method may have a particularly simple technical design if only one camera is used for this purpose. Preferably, such a camera may already be installed in the vehicle, such as a rear view camera. In particular, the vehicles require only a possibility of lane-accurate self-localization and one camera for carrying out the observations. The prerequisites are increasingly met by series vehicles, whereby special manufactures are avoided. The camera may be oriented toward the front and/or back and does not have any requirements with regard to the image quality. Since such vehicles permanently carry out observations and report them to the external server unit, the lane-accurate road map may be updated at a high rate.

According to one further exemplary embodiment, a number and/or kind of lane markings on the right side and left side is/are ascertained by the at least two vehicles and transmitted to the external server unit in the form of observation data. In addition to the respective lane-accurate self-localization, the vehicles are additionally able to ascertain the roadway markings which laterally delimit the traffic lanes or the road. In this way, the lane markings may be introduced as additional pieces of information into the observation data, whereby the analysis of the external server unit is able to attain further pieces of information based on the traffic lane markings assigned to the lanes and assign them to the road map.

According to one further exemplary embodiment, the traveled road segments are transmitted to the external server unit together with the corresponding lanes in situ, after a road segment or after a completed trip. In this way, the method may be designed to be particularly flexible. The number of established links may be reduced when the observations carried out by the vehicles are transmitted to the server unit after a completed trip or after a defined time. In contrast, the updating of the road maps may take place in real time when the observation data are transmitted to the server unit immediately or in situ.

According to one further exemplary embodiment, observation matrices are created from the observation data in the external server unit for each road segment. An observation matrix has a statistical distribution of traveled traffic lanes and of the kinds of lane markings assigned to the at least two traffic lanes. In this way, each road in the digital map which is to be annotated with pieces of lane information may be divided into road segments according to its length. From a plurality of transmitted observation data, an observation matrix which has a statistical distribution of the possible or traveled traffic lanes, including corresponding traffic lane boundaries or markings on both sides, is assigned to each road segment.

In this way, a road segment-wise analysis may be carried out by the server unit, which may be carried out in a simple technical manner.

According to one further exemplary embodiment, the external server unit includes a trained neural network, each observation matrix being analyzed by the neural network and being assigned a roadway class. The analysis of the respective observation matrices may take place by the neural network of the server unit. In this way, a robust and fast option for evaluating statistical data may be provided. In particular, a neural network may be trained in such a way that it is not sensitive to observation errors of individual vehicles. The external server unit is thus not only able to efficiently handle faulty lane-accurate localizations at a high rate, but also lane markings identified as faulty.

The neural network may, in particular, be used for the assignment of the respective observation matrices in road classes on which these observations were made by the vehicles. Each of these road classes unambiguously describes an option as to how a road may be divided into lanes using different lane markings. If the road class of the road segment is known, the corresponding properties regarding the number of the lanes and type of lane markings may be added to the digital map.

According to one further exemplary embodiment, measuring errors are removed from an observation matrix by the neural network. In this way, the neural network may be used to eliminate the faulty observations stored in the observation matrix, as an alternative to neglecting or ignoring errors. Such faulty observations may, for example, be fifth or sixth traffic lanes in the case of a four-lane road or incorrect roadway boundaries. The neural network may include an output level, which has the same interpretation as an input level, whereby the neural network is used to remove the measuring errors from the observation matrix.

According to one further exemplary embodiment, a road is divided into road segments of equal length or different lengths. In this way, roads may be flexibly divided into road segments. Depending on the situation, a division into segments, which [extend] from one intersection to a next intersection, or a division with the aid of signs or distinctive points, may be advantageous since, in this way, the number of road segments is reduced. The evaluation by the server unit may thus be expedited.

Preferred exemplary embodiments of the present invention are described in greater detail below based on highly simplified schematic representations.

BRIEF DESCRIPTION OF THE DRAWINGS

In the figures, the same design elements in each case have the same reference numerals.

DETAILED DESCRIPTION OF EXAMPLE EMBODIMENTS

Figure 1:
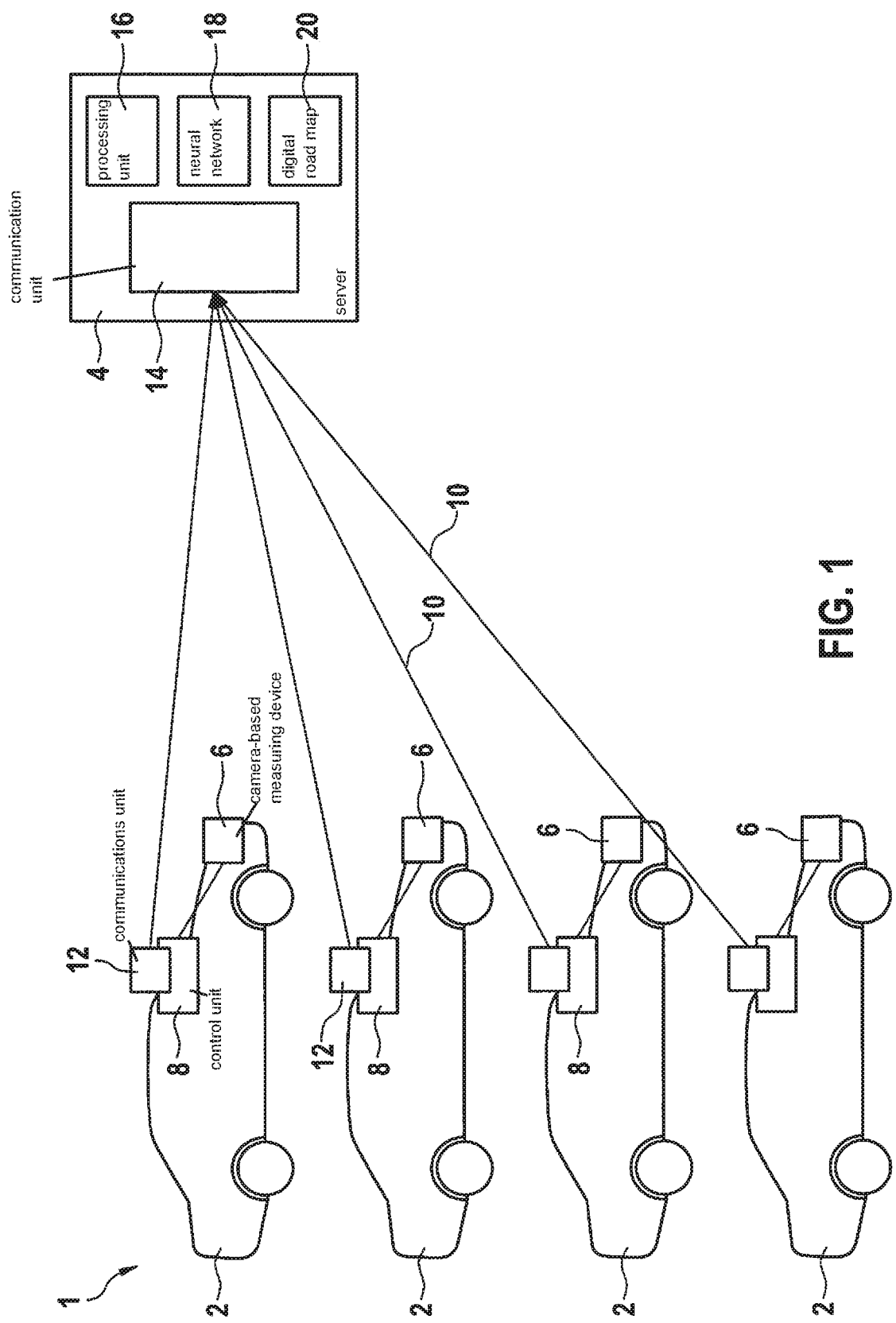
FIG. 1 shows a schematic representation of a system according to one specific embodiment of the present invention.

FIG. 1 shows a schematic representation of a system 1 according to one specific embodiment of the present invention.

System 1 includes a plurality of vehicles 2, which transmit observation data to an external server unit 4.

Vehicles 2 include a camera-based measuring device 6. Measuring device 6 is designed in the form of a front camera having corresponding activation. Measuring device 6 is connected to a control unit 8 in a data-conducting manner.

Control unit 8 includes an integrated GPS sensor which is used, together with measuring device 6, for a lane-accurate self-localization.

As a result of measuring device 6, vehicles 2 are able to identify which roadway markings are situated on the left side and right side of vehicle 2 on the roadway. Based on the GPS sensor and/or based on the ascertained roadway marking, vehicle 2 is able to estimate on which traffic lane it is presently situated. The roadway marking may preferably take place by an evaluation of video data or image data of measuring device 6. Measuring device 6 may be a camera-based measuring device 6 for this purpose. Furthermore, vehicle 2 may ascertain the presently traveled or already covered road segment.

The ascertained measuring data of measuring device 6 and of control unit 8 may be transmitted as observation data via a wireless communication link 10 to the external server unit. A communication unit 12 of control unit 8 establishes communication link 10 with a communication unit 14 of server unit 4.

The transmitted observation data of a plurality of vehicles 2 are transformed in processing unit 16 into road segment-specific observation matrices and subsequently analyzed by a neural network 18. The results of neural network 18 may be assigned by external server unit 4 to a digital road map 20.

Figure 2:
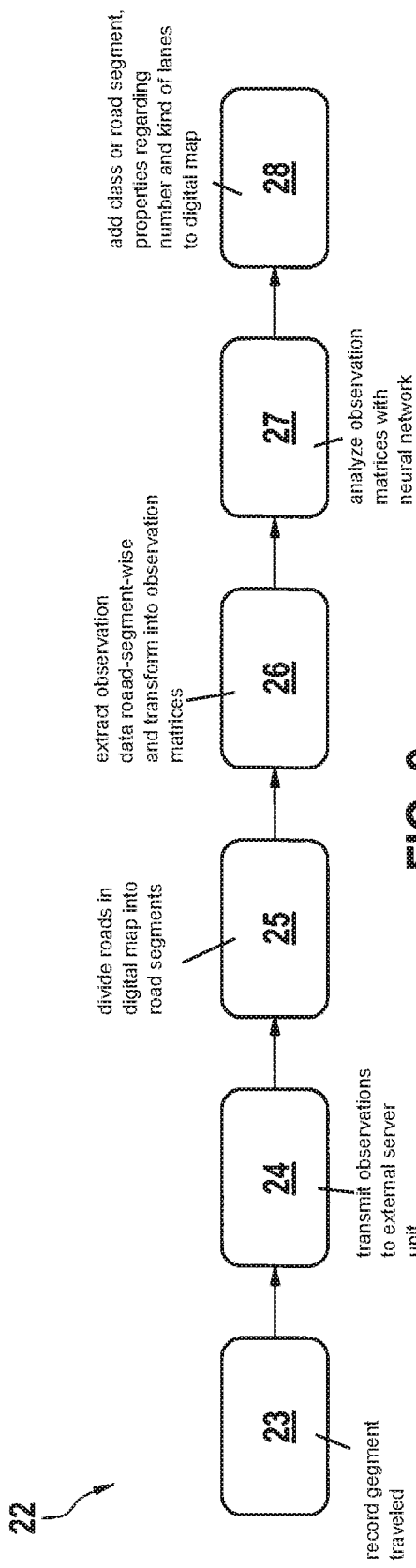
FIG. 2 shows a schematic diagram to illustrate a method according to one specific embodiment according to the present invention.

FIG. 2 shows a schematic diagram to illustrate a method 22 according to one specific embodiment according to the present invention.

Each vehicle 2 records 23 the segment traveled by this vehicle 2. For this purpose, it is recorded for the driven sequence of roads in each case on which lane vehicle 2 was situated. The roads may be known to vehicle 2 from an onboard map, for example. The information as to the lane on which vehicle 2 passed the road may take place by a host lane estimation. Furthermore, lane changes may be registered by control unit 8. With the aid of measuring device 6, vehicle 2 may ascertain what lane markings are present on both sides of vehicle 2. The host lane estimation may, for example, take place with the aid of GPS data and/or by an evaluation of video data or image data, which were recorded, for example, by camera-based measuring device 6.

The host lane estimation and the lane marking identification may be subject to errors. The corresponding road segments subject to errors which are recorded by vehicles 2 all have ascertained observation data R. In particular, observation data R may include a great amount P of all traveled road segments, a great amount S of all possible lanes of the road segment, possible geographical positions P, and possible lane markings M. As a result, the following relationship applies:

$R \in (P \times S \times G \times M \times M)$

Lane marking M is taken into consideration twice here, so that a distinction is made between a possible left-side and right-side lane marking. Possible lane markings M may, for example, be solid, dotted, solid in color and the like. Geographical position G may be implemented in the form of WGS85 coordinates.

For example, it is possible to infer, based on the following observation, data of a possible lane-accurate route r subject to errors $r = ((p_0, s_0, g_0, m_{1,1}, m_{1,2})$
$(p_0, s_1, g_1, m_{2,1}, m_{2,2})$
$(p_1, s_2, g_2, m_{1,3}, m_{1,3})$
$(p_1, s_3, g_3, m_{4,1}, m_{4,2})$ that a vehicle 2 at $g_0$ on road $p_0$ used lane $s_0$, and at $g_1$ on $p_0$ changed from lane $s_0$ to $s_1$. Thereafter, at $g_2$ a change was carried out from road $p_0$ lane $s_1$ to road $p_1$ lane $s_2$, and at $g_3$ on $p_1$ from lane $s_2$ to lane $s_3$. In this, on $(p_0, s_0)$, $m_{1,1}$ was identified as the left marking and $m_{1,2}$ as the right marking, $m_{2,1}$ and $m_{2,2}$ were identified for $(p_0, s_1)$. In this, $p_0$, $p_1$ correspond to $\in P$, $s_0$, $s_1$, $s_2$, $s_3$ to $\in S$, $g_0$, $g_1$, $g_2$, $g_3$ to $\in G$, and $m_{1,1}$, $m_{1,2}$ to $\in M$.

These observation data R are subsequently transmitted 24 from vehicles 2 to external server unit 4. Observation data R may be collected in server unit 4. Server unit 4 includes an electronic road map 20. Road map 20 neither has to be up-to-date nor has to include pieces of information about the roads for this purpose. As a result of method 22, all relevant pieces of information about the lanes of road map 20 may be generated in an automated manner.

Each road in digital map 20 which is to be annotated with pieces of lane information is divided 25 into road segments in its longitudinal direction. For example, the road segments may have a length of 15 m. The road segments may also have a length which is adapted as a function of the situation.

Thereafter, the observation data are extracted road segment-wise for each of these road segments and transformed 26 into observation matrices B. For example, observation data R may include a plurality of elements $r_1, \ldots, r_m \in R$, where m=10000, for example, these elements r describing observations on the corresponding road segment. The pieces of information from each road segment form a dedicated observation matrix.

Figure 3:
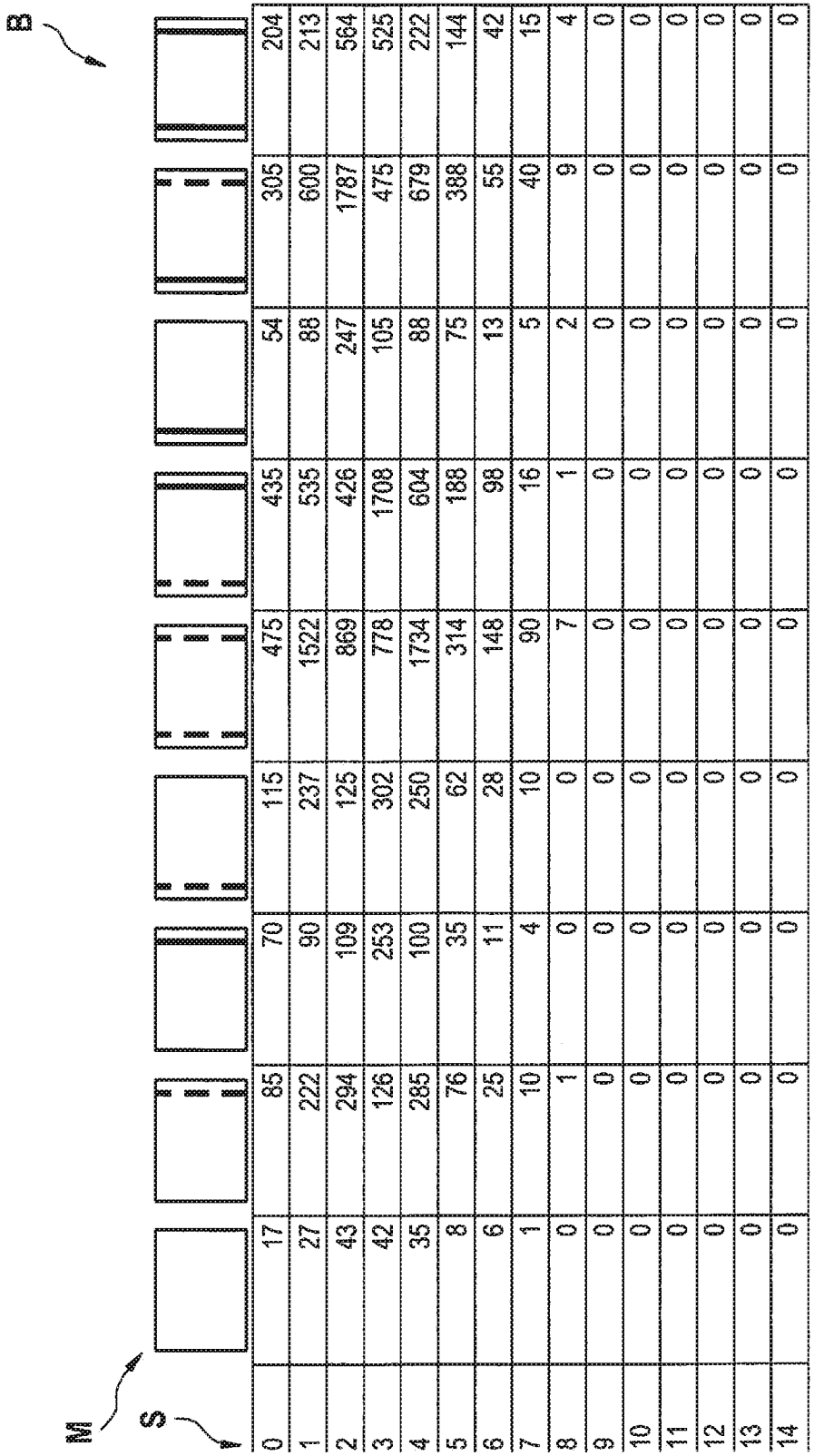
FIG. 3 shows an exemplary observation matrix for a road segment.

Each observation matrix includes entries $B_{i,j}$. The entries of observation matrix B represent frequencies with which lane-lane marking combinations (i, j) occurred in the observations. FIG. 3 shows such an observation matrix B. In particular, the observation matrix shows lanes S identified by vehicles 2 in the form of numbers, and roadway markings M identified on both sides.

Figure 4:
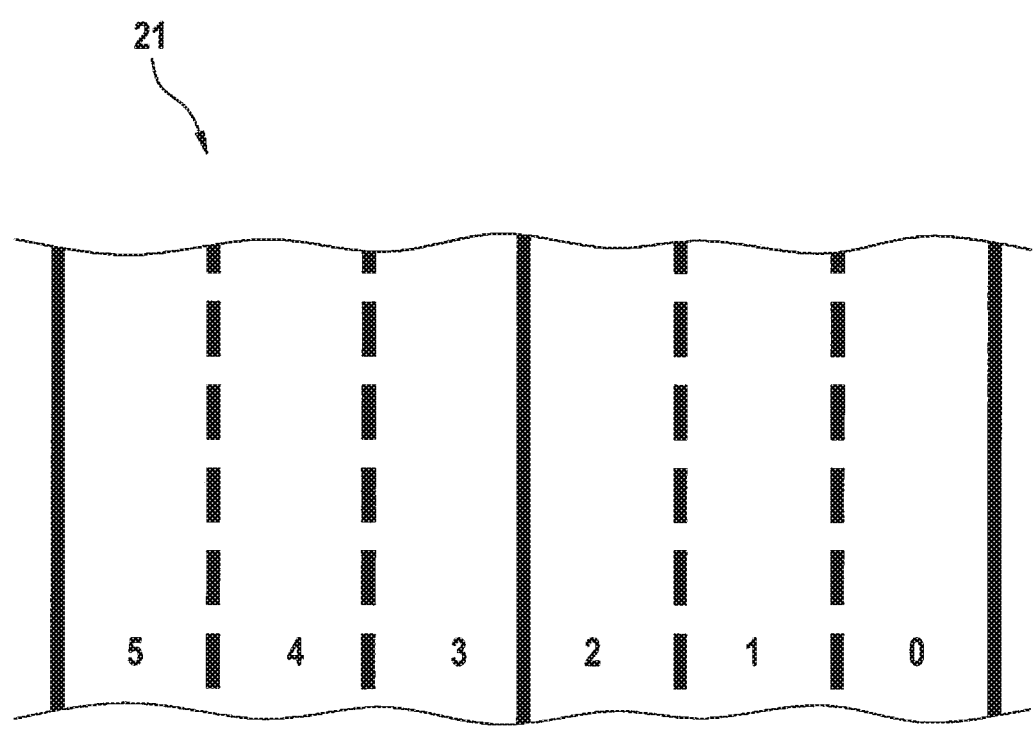
FIG. 4 shows a schematic road segment for which the observation matrix was created based on observations by vehicles from FIG. 3.

Observation matrix B shown in FIG. 3 was ascertained from a road segment 21 shown schematically in FIG. 4. Road segment 21 is designed as a six-lane road.

Observation matrix B is subsequently analyzed 27 by a neural network 8 which assigns these observations to one of multiple classes. Each of these classes describes an option as to how a road may be unambiguously divided into lanes S using different lane markings M. If the class of the road segment 21 is known, the corresponding properties regarding the number of the lanes and kind of lane markings may be added 28 to the digital map 20.

Upon entry of an observation matrix B, neural network 18 may output the corresponding road class on which these observations have been made. A finite number of road classes exist, each road class describing an unambiguous combination of lane markings.

Used neural network 18 may be designed as a so-called "feedforward neural network" having multiple hidden levels. Moreover, the observation matrices may be normalized in a value range [0, 1]. For example, neural network 18 may include x·y input nodes and o output nodes, o representing the number of all (useful) road classes, x the maximum number of lanes, and y the number of all combinations of road markings of one lane. According to observation matrix B shown in FIG. 3, x=15 and y=9. The road classes are completely and unambiguously numbered even before the training phase of neural network 18 and are each assigned to exactly one of the output nodes of neural network 18.

What is claimed is:

1. A method for automatically maintaining a digital map of roads in an up-to-date form using a plurality of vehicles that each (1) carries out a host lane localization that identifies (a) respective lanes on which the respective vehicle is traveling over time and (b) respective pairs of lane markings of the respective lanes and (2) transmits pieces of information identifying the lanes and pairs of lane markings, the method comprising:

receiving, by an external server unit, the pieces of information transmitted by the vehicles;

maintaining, by the external server unit, for each of a plurality of road segments of the digital map a respective matrix that includes a respective count for each of the pairs of lane markings separately for each of the respective lanes identified in the pieces of information transmitted by the plurality of vehicles;

for each of the respective lanes identified in the pieces of information transmitted by the plurality of vehicles, incrementing, by the external server unit, the respective counts of the pairs of lane markings each time the respective count is identified for the respective lane in the transmitted pieces of information;

using a trained neural network of the external server unit to perform, for each of the road segments, a respective lane classification that is updated over time based on values of the counters of the respective matrix of the respective road segment; and updating, by the external server unit, the digital map based on the lane classifications.

2. The method as recited in claim 1, wherein the host lane localization is carried out using camera-based systems of the vehicles.

3. The method as recited in claim 1, wherein the identifications of the respective pairs of lane markings includes an identification of a respective number and/or kind of lane markings on a right side and a left side of the respective vehicle.

4. The method as recited in claim 1, wherein the pieces of information are transmitted to the external server unit in batches after respective completed trips.

5. The method as recited in claim 1, further comprising removing, by the external server unit using the neural network, measuring errors from at least one of the matrices.

6. The method as recited in claim 1, wherein a road is divided into the road segments, the road segments being of equal length or of different lengths.

7. The method as recited in claim 1, wherein the lane classification includes classifying a number of lanes present in the lane segment based on the values of the counters associated with respective lane numbers identified in the pieces of information received by the external server unit from the vehicles.

8. A system for automatically maintaining a digital map of roads in an up-to-date form, the system comprising:

an external server unit; and a plurality of vehicles communicatively coupled to the external server unit wherein:

each of the vehicles includes a communication unit, at least one sensor, and a control unit that is configured to:

carry out a host lane localization using the at least one sensor by which the control unit identifies (a) respective lanes on which the respective vehicle is traveling over time and (b) respective pairs of lane markings of the respective lanes; and transmit, to the external server unit and using the communication unit, pieces of information identifying the lanes and pairs of lane markings;

the external server unit is configured to maintain for each of a plurality of road segments of the digital map a respective matrix that includes a respective count for each of the pairs of lane markings separately for each of the respective lanes identified in the pieces of information transmitted to the external server unit by the plurality of vehicles;

for each of the respective lanes identified in the pieces of information transmitted to the external server unit by the plurality of vehicles, the respective counts of the pairs of lane markings is incremented each time the respective count is identified for the respective lane in the transmitted pieces of information; and the external server unit is configured to perform for each of the road segments a respective lane classification that is updated over time based on values of the counters of the respective matrix of the respective road segment, and update the digital map based on the lane classifications.

\* \* \* \* \*